Patented Jan. 15, 1935

1,987,870

UNITED STATES PATENT OFFICE 1,987,870

PROCESS FOR BREAKING EMULSIONS

Charles J. Robinson, Claremont, Calif., assignor to L. Blake-Smith, San Francisco, Calif.

No Drawing. Application March 18, 1933, Serial No. 661,586

18 Claims. (Cl. 196—4)

The object of my invention is to provide a method for rapidly and certainly resolving emulsions of oil and water into their constituents, the invention being applicable to the type of emulsion in which water is the disperse phase (known as water-in-oil emulsion) and to the type in which oil is the disperse phase (known as oil-in-water emulsion).

An example of the first named type is the emulsion often produced in bringing crude petroleum to the surface, this type of emulsion having oil as the continuous phase and therefore being miscible with oil.

An example of the second named type is the emulsion often produced in treating petroleum lubricating oils, first with acid and then with alkali and water. This type of emulsion has water as the continuous phase and therefore is miscible with water.

In a copending application filed May 21, 1932 under the title "Process for resolving emulsions" and bearing Serial No. 612,855, I have disclosed and claimed a process in which the essential step is to contact the emulsion with a granulated substance having a relatively high adhesion tension for the liquid of the disperse phase, the substance used having no known chemical reactivity with any constituent of the emulsion and acting solely by reason of its superior superficial affinity for the disperse constituent of the emulsion to cause the agglomeration of the dispersed particles into drops of such size as will separate from the mass by a gravity effect.

The agents described and claimed in the copending application are of highly varied nature chemically, their usefulness being measured primarily by the relation of their adhesion tension with the disperse liquid to their adhesion tension with the continuous liquid, modified by a requirement for such relatively high specific gravity as will cause the solid to pass rapidly through the emulsion mass and by a requirement for such degree of hardness as will prevent undue wearing away of the hard granules by attrition.

In applying the process of the copending application I customarily used the agent in the form of a rather coarse powder, for instance such as would pass a 40-mesh screen and be retained on a 60-mesh, any fine dust which might adhere to these grains being washed away. In repeated trials of this process I observed that while, in many cases, resolution of the emulsion would start as soon as agitation of the solid with the emulsion began, in other cases resolution would not occur at any useful rate until agitation had been continued for some little time. I also observed that in the cases where resolution was slow in starting it would continue to accelerate for a considerable time until it reached a rapid rate, and that in long continued treatments in which all the solid matter was retained in the treating vessel and contacted with a flow of emulsion, the rate of resolution would reach an apex after which it would gradually or rapidly decline and sometimes entirely cease.

In investigating these observations I discovered that the acceleration of the resolution rate is due to the formation, by attrition, of a small proportion of colloidal or at least of very finely divided solid treating material, and that the rate of resolution is accelerated until this finely divided solid reaches an optimum proportion to the mass of emulsion in which it is suspended, and that when this optimum proportion is overreached the rate of resolution is decelerated and, if carried sufficiently far, the resolution is finally terminated.

Reasoning from these observations, I further discovered that by initially adding to the emulsion, with the coarsely powdered solid, a small quantity of the same or a similar agent reduced to a very fine state of subdivision, the resolution effect could be produced immediately and at its maximum rate; also that the rate of resolution could be materially increased by using with the finely divided agent a coarser agent than I had originally contemplated; also that the use of the finely divided agent enables me to utilize, in coarse grains, solids having a lower adhesion tension relation than I had used in the process of the copending application; also that the proportion of fines can be controlled in the course of a long continued treatment and can be maintained at or near the optimum by the application of a simple visual test; all of which matters will be fully set forth hereinafter.

The process of the present invention consists of the following steps: (1) selection of the treating material or combination of materials most suitable for the particular emulsion to be treated; (2) sizing of the treating material or materials; (3) proportioning of the coarse and fine material to the body of emulsion; (4) maintaining contact between the emulsion body and the solids by any one of several well known methods; (5) maintaining and controlling the proportion of finely divided solids in the mass; (6) separating the solids from the resolution products, and (7) separating the resolution products from each other.

(1) *Selection of treating materials or combinations of materials*

The essential requirements of suitable treating materials are: (a) lack of any appreciable chemical reactivity or solubility with any constituent of the emulsion; (b) adhesion tension with the liquid of the disperse phase greater than the adhesion tension with the liquid of the continuous phase; (c) specific gravity materially different from that of the emulsion, i. e., heavier than its heaviest constituent or lighter than its lightest constituent, according to the method of application. An additional requirement for only the coarse treating agent is such degree of hardness as will prevent undue conversion of coarse into fine particles by attrition in long continued treatments.

Lack of chemical reactivity and solubility is a requisite for the reason that the treatment herein described depends purely on surface phenomena and the consumption of the treating agents is to be avoided. In avoiding the consumption of the treating agent, the initial charge of agent is caused to maintain its treating efficiency over very long periods of continuous treatment, extending into months or until the coarse particles become too much reduced in size by attrition or the fine particles are lost by physical wastage. It is also a requisite in that, to maintain the treatment at an even rate over long periods, the condition of the surfaces of the solid particles should not be changed by chemical action. The requirement for lack of chemical reactivity and solubility extends to the fine as well as the coarse agent, as while the finely divided zeolites and bentonite used by Brown & Meinzer Patent No. 1,911,727 will function in the same manner as my fine agent in some cases and for a limited time, they rapidly become inert and cease to function and also are practically impossible to separate from the resolution products for reuse; so that in practice they must constantly be supplied to the system. Further, as the agents are to be kept in use for long periods, it will be obvious that they must be substantially insoluble in any of the emulsion constituents.

The adhesion tension requirement for the coarse solid is materially less rigid than that set forth in the copending application, and a useful and valuable result may be obtained with any material having the other requirements herein set forth together with an adhesion tension with the dispersed liquid materially greater than the adhesion tension with the continuous liquid. The adhesion tension relation may be measured in the manner set forth in the copending application and reproduced in a later paragraph hereof under the heading "Method of measuring adhesion tension relations".

The suitability of the material may also be determined by a simpler test. Portions of the two constituents of the emulsion, e. g., water and clear hydrocarbon oil, are both poured into a test-tube. A sample, one or two grams, of the solid agent, powdered relatively fine, perhaps between 50 and 100 mesh, is added to the liquids, and the mixture shaken vigorously for a minute or two. On standing, the powder settles to the bottom, but will be coated with that one of the two liquids for which it has the greater adhesion tension. If the two liquids are a hydrocarbon oil and water, and the solid has a greater adhesion tension for the oil than for water, it will be filmed with oil even after it has settled into the water, and this fact can readily be observed by visual examination of the powder. There will also be a marked tendency for such a powder to remain at the oil-water interface instead of settling into the water. On the other hand, if the powder has a markedly greater adhesion tension for water than for oil, it will settle rapidly through the interface, and waetr will soon displace any oil from those particles which might have momentarily been wet with oil; so that the powder will lie at the bottom of the test-tube practically free from oil.

Where the formal adhesion tension test hereinafter described is applied, the relation of the adhesion tensions should not be less than 1.5 to 1.0.

For reasons hereinafter stated, the adhesion tension requirement for the fine solid is as severe as that set forth in the copending application, and when the formal adhesion tension test is applied the relation of the adhesion tensions should not be materially less than 2.5 to 1.0.

It has been found in practice, however, that where the fine solids result from the mutual abrasion of the coarse solids, a satisfactory result in the resolution of the emulsion is produced even though the coarse material from which these fines are produced has an adhesion tension relation not greater than 1.5 to 1.0.

The simpler test described above may be applied somewhat more rigidly for selection of a suitable fine solid, by using a finer powder, say between 100 and 150 mesh, and selecting only such kinds of materials as pass freely through the interface from oil to water.

The specific gravity requirement is based on the fact that the methods of application hereinafter described all function by reason of a gravity effect; that is to say, the coarse particles of agent are removed from their normal position (above or below the emulsion body) to an opposed position, from which they return under the influence of gravitation, contacting the dispersed particles during this return movement. As the agglomeration of the dispersed particles into separable masses is a function of the number of contacts so produced, the treating efficiency of the agent will, other things being equal, vary directly as the gravity difference between the agent and the emulsion.

The most suitable treating agent will therefore be an insoluble, nonreactive solid body having the highest available adhesion tension for the liquid of the disperse phase together with the highest specific gravity difference and, in the case of the coarse agent, the greatest hardness. In the case of the finely divided agent there is no requirement for hardness.

As illustrative of materials suitable for use in this process, and without limiting myself thereby, I name the following:

For the treatment of water-in-oil emulsions with solid agents heavier than water: coarse agent—hematite (hard varieties), martite, garnet, hornblende (massive), magnetite, pyroxene, quartz, glass, alundum, corundum; fine agent—any of the above, also hematite (soft varieties) and limonite.

For the treatment of oil-in-water emulsions with solid agents lighter than the oil constituent: coarse agent—wood, cork, pumice, sepiolite, leather, all reduced to fragments or pellets of suitable size and preferably oil-wetted before use; fine agent—fine sawdust (preferably hardwood), cork dust, coke dust, coal dust (preferably cannel coal), phenol-formaldehyde condensation products, and hard rubber.

These agents may be used singly or in intermixture, with due regard to size and weight requirements.

(2) *Sizing of the treating material*

The function of the coarse particles in this process is to agglomerate into drops or masses the minute particles of dispersed liquid which have been contacted by the fines. The function of the fine particles of solid is to set up an incipient inversion of the emulsion which, being arrested at the point of reversal, effectively liberates the dispersed liquid particles from the forces (whatever they may be) which hold them in the emulsified form.

For reasons already given, it is desirable that the coarse particles should gravitate through the emulsion mass at the highest speed, and I therefore reduce the coarse agent to such size that the weight of the particle will bear a high relation to its exposed surface. Sizes passing a 5-mesh screen and retained on a 12 mesh form a suitable range where the specific gravity of the solid is from 3.0 to 4.0; but for lighter solids even much larger sizes are desirable, and are permissible in all cases. Where the emulsion to be treated is extremely viscous, the size of the coarse particles may be increased.

As the fine particles act as an inverting agent, it is desirable to have them expose the greatest possible amount of surface, and for this reason I reduce them to a state of very considerable fineness. Preferably these particles should all pass through a 100-mesh screen, in order to produce an initially rapid action; but it may be observed that unless the material of these particles is very hard, they will rapidly be ground to a much finer condition by attrition between the more rapidly moving coarse grains.

(3) *Proportioning coarse and fine material*

The optimum amount of coarse material will vary over a wide range, depending on the physical methods employed in effecting the movement of the solid through the emulsion. In methods which employ the velocity of the emulsion stream to lift and distribute the solids, the charge will be limited to the quantity which can be effectively lifted and distributed by the available velocity, the maximum charge increasing as the specific gravity decreases. In methods which mechanically raise or lower the solid and permit it to return to a position of rest, the optimum charge is that at which the increase in effectiveness due to increased surface is balanced by the decreased amount of emulsion retained in the treating vessel. As illustrative only, the charge in apparatus using velocity methods may be of the order of two pounds of coarse solids per gallon of emulsion, while in methods in which the solid is moved mechanically the charge may be double that amount.

The initial dosage of fines is a somewhat delicate matter and at present I know of no way to determine it other than by empirical experiment with the particular emulsion to be resolved, adding increasing quantities of the finely ground agent to test samples of emulsion together with a constant quantity of the coarse material, agitating under constant conditions as to degree, time, and temperature, and noting the resolution produced. In any case the dose will be relatively small, as for instance 0.1 lb. to 0.2 lb. per gallon of emulsion. When the treatment is once in progress in a continuous apparatus, the dose of fines may be controlled to produce the most efficient operation, as will be described, for which reason the application of the most exact initial dosage is not of the first importance.

(4) *Producing and maintaining contact*

In order to produce resolution of emulsion with the agents described, the fine solids must be kept in suspension in the emulsion and the coarse solids must be maintained in rapid movement through the emulsion body. This movement, with simultaneous suspension of the fines, may be produced in many different types of apparatus, as for instance: by means of a flow of air or gas, as described in the patent to G. H. Meinzer, No. 1,911,840; by means of a pulsating flow of emulsion as described in the patent to G. H. Meinzer, No. 1,887,774; by means of a rotating vessel having lifting or depressing vanes as described in the application of William F. Van Loenen, Serial No. 612,847, filed May 21, 1932. While I prefer the latter operation as producing a travel of the coarse solids through the emulsion body in only one direction, and that the direction in which the disperse phase moves to join an agglomerated body of the disperse liquid, I claim no invention, in this present application, in method of contacting the solid with the liquid, and may use any known or preferred apparatus for that purpose.

(5) *Controlling the proportion of fines*

As before stated, the finely divided solid must be considered as an emulsion inverting agent, tending to produce an emulsion of the type the reverse of that being treated. The resolving effect of the agent increases with its adhesion tension with the liquid of the disperse phase, but for any given material is a function of the extent of exposed surface rather than of the actual weight of fine solid present. The weight remaining constant the surface exposure may be increased by finer grinding of the solid, such as will take place by attrition between the coarser grains, while the weight of fines present may be increased by mutual attrition of the coarse grains and, in instances where finely divided clays and shales are present in the emulsion, by the passage of these bodies into the water layer. On the other hand the weight may be decreased by physical loss of fines entrained in the oil product, where they are invisible but will be shown in a centrifuge test, and especially in the waste water, where they are plainly visible.

In every continuous treatment and resolution of emulsion the initial product is a mixture of oil and water which will separate by gravitation into sharply defined layers, and such layers are maintained in the treating vessel or in a separating vessel, or both. The water produced by resolution is a waste product and is withdrawn, the oil being passed to storage or to a secondary settling vessel where traces of free water may subside.

On account of their rapid sedimentation, it is usually possible to retain the coarse solids in the treating vessel, but in all types of apparatus having a separate settling vessel, a portion of the fines will be carried out of the treating vessel in suspension in the water, forming a sludge or slime in the bottom of the settling vessel. The first step in maintaining the optimum proportion of fines in the treating vessel is to return all or the requisite part of this sludge to the treating vessel. It is of such consistency as to be readily handled through a pumping means and the return with the sludge of a moderate amount of water is seldom harmful and usually beneficial to the treatment.

The proportion of fines in the treating vessel is controlled by withdrawing or discarding small amounts of this sludge if the proportion becomes excessive, and by adding new fines to the returned sludge if the proportion becomes too small. As there is seldom an actual loss of fines the requirement is usually for a reduction in the quantity as the fines grind to a smaller rize or increase in quantity in the manner above stated.

Any departure from the optimum dose of fines will be indicated by the failure to obtain complete resolution of the emulsion, as indicated by the centrifuge cut. This indication, however, does not show the direction in which the optimum is departed from. Such information may be had from the appearance of the water layer, drawn from a medial point in the treating vessel or separator as the case may be, in a manner which varies with the type of emulsion being treated.

If the emulsion is of the usual water-in-oil type, an excessive amount of fines will produce a material quantity of inverted or oil-in-water emulsion, which will be manifest in the water layer as floating webs or films consisting of oil droplets surrounded by colloidal solids. If the separated water is entirely clear, the proportion for rapid and complete resolution is indicated by a slight turbidity in the separated water due to colloidal fines, with perhaps a trace of inverted emulsion. The spread of concentration of fines through which satisfactory results can be achieved is sufficiently broad to make control practically feasible.

If the emulsion being treated is of the oil-in-water type, an entirely different set of indications is obtained. The partial resolution of an emulsion of this type liberates a portion of the oil in a water-free condition, or in a condition where it contains only such relatively large drops as will readily separate on standing. The appearance in the oil delivery of traces of water-in-oil emulsion is a definite indication of the presence of an excessive amount of fines in the mass under treatment. In the other direction, if the water draw shows more than a trace of oil being carried out, either the apparatus is being overfed and worked beyond its capacity or the proportion of fines is too small. If the feed rate is that at which the apparatus has normally been working on the same material, it is safe to assume that the dose of fines is too small, but if a normal operating rate is not available for comparison, the feed should temporarily be reduced and, if this reduced rate of treatment does not correct the difficulty, the proportion of fines should be increased. As this determination is slow and causes some loss of throughput, it is desirable to carry a faint trace of inverted (water-in-oil) emulsion in the oil delivery, which will indicate the optimum dosage of fines, and this trace may be so faint as to be visible only as a line in a centrifuge cut and not evident in the oil itself.

(6) *Separating the solids from the resolution products and separating the resolution products from each other*

These two steps are functionally distinct but as they occur simultaneously, they cannot be separately described.

The coarse solids, because of their high relation of weight to surface, pass readily through the emulsion mass and through any separated layers of resolution products to their position of rest, and their separation offers no difficulty.

This is not true of the fines, which must be dispersed in the continuous liquid in order to exercise their inverting effect on the dispersed liquid particles and must pass into an agglomerated layer of the dispersed liquid in order that they may remain wetted with the liquid of the dispersed phase. From this agglomerated layer they must then be withdrawn and returned to the system.

To illustrate by example of the typical water-in-oil emulsion, which in progress of resolution forms a layer of water below a layer of oil containing more or less emulsion yet to be resolved. The coarse solids, being lifted in any manner from their position of rest at the bottom of the water layer, pass through the layer of oil, accumulating therefrom water droplets, and return to the water layer where these droplets are added to the agglomerated mass. The fine solids, however, must be retained in the oil layer for a somewhat longer time and this, because of their low relation of weight to surface, is their natural tendency. They cannot, however, remain permanently in the oil layer because, while it would be entirely feasible to separate them from the discharge oil and return them to the system, long continued contact with a mass of oil substantially free from water would cause them to become oil-wetted, in which condition they would be inert and nonfunctional as a reversing agent.

The fines must therefore be caused to pass continuously out of the oil layer into the water layer, where any adhering oil will be displaced and the full water-wetability of the solid particle restored, and from this layer the fines will subside as the above mentioned sludge. To produce this result the solids selected for the production of fines must have a higher adhesion tension with water than is requisite in the case of the coarse solids, in order to avoid their accumulation at the oil-water interface. Also, the apparatus must provide a liberal space of substantial quiescence in which the fine solids may work their way through the interface and in which free water may subside from the oil layer.

By observing the above precautions the final product of resolution may be continuously accumulated in the form of an upper layer of oil, more or less free from suspended water and residual emulsion (according to the extent to which the treatment is carried), an intermediate layer of water substantially free from oil and from fines, and a bottom layer of sludge carrying enough water to render it suited to pumping. From these three layers the fines may be returned to the system, the water withdrawn and discarded and the oil directed to any suitable point for storage or use.

Where the emulsion under treatment contains a material proportion of earthy matter, shale or clay, this finely divided solid will become water-wetted if it is not already in such condition, will pass into the water layer, and will finally form a fourth layer between the clear water and the top of the layer of sludge. Where this condition is known to exist in the emulsion, the fine solid chosen should be of the highest possible specific gravity in order that it may separate as completely as possible from the earthy matter in subsiding through the water layer.

A mere reversal of the terms of the above description will make it apply to the treatment of oil-in-water emulsions with solids lighter than oil, the solids in such case being withdrawn from the top of the oil layer and returned to the bottom of the water layer.

(7) *Method of measuring adhesion tension re-relations*

Dry glass tubes of 3 to 6 mm. internal diameter (results are the same with various diameters) are closed with cotton at one end and filled with powdered solids, then tapped until the powder settles no more. For comparing various solids, it is important that all of them be ground to the same size of particle, in order that capillary forces be equal in all, since capillary attractions are related to the capillary diameters. Measurements may be made with powders passing an 80-mesh screen, but retained on a 100-mesh screen. These powders should be washed thoroughly with water to remove fine dust, then dried completely. When the tubes are filled with the powders, they are mounted vertically in shallow containers for liquids. When the liquid comes in contact with the powder, it creeps upward, wetting the powder, and work is done in lifting the liquid against the force of gravity. The height to which the liquid travels up the column of powder is measured in millimeters. The climb of liquid is rapid, in most instances, during the first few hours but continues more and more slowly for many days.

The relative adhesion tensions mentioned in the claims are in terms of the millimeters rise of the respective liquids in powders of 80 to 100 mesh, in 20 hours, at ordinary room temperature.

I claim as my invention:

1. The method of resolving an emulsion which comprises: simultaneously and intimately contacting with said emulsion a relatively large quantity of a coarsely powdered solid and a relatively small quantity of a finely powdered solid, both said solids being insoluble in and chemically inert to all constituents of said emulsion and having adhesion tension with the dispersed liquid not substantially less than 2.5 times their adhesion tension with the continuous liquid of said emulsion and a specific gravity materially different from that of said emulsion, and so controlling the proportion of said fine solid in said emulsion as to produce resolution of said emulsion at a desired rate.

2. The method of resolving an emulsion which comprises: simultaneously and intimately contacting with said emulsion a relatively large quantity of a coarsely powdered solid having adhesion tension with the dispersed liquid not less than 1.5 times its adhesion tension with the continuous liquid and a relatively small quantity of a finely powdered solid having adhesion tension with the dispersed liquid not less than 2.5 times its adhesion tension with the continuous liquid, both said solids being insoluble in and chemically inert to all constituents of said emulsion and having a specific gravity materially different from that of said emulsion, and so controlling the proportion of said fine solid in said emulsion as to produce resolution of said emulsion at a desired rate.

3. The method of resolving an emulsion which comprises: simultaneously and intimately contacting with said emulsion a relatively large quantity of a solid body comminuted to be substantially retained on a 12-mesh screen and a relatively small quantity of a solid body comminuted to substantially pass a 100-mesh screen, both said solids being insoluble in and chemically inert to all constituents of said emulsion and having adhesion tension with the dispersed liquid substantially greater than their adhesion tension with the continuous liquid; and so controlling the proportion of said fine solid in said emulsion as to produce resolution of said emulsion at a desired rate.

4. The method of resolving an emulsion which comprises: simultaneously and intimately contacting with said emulsion a relatively large quantity of a solid body comminuted to be substantially retained on a 12-mesh screen and having an adhesion tension with the dispersed liquid not less than 1.5 times its adhesion tension with the continuous liquid, and a relatively small quantity of a solid body comminuted to substantially pass a 100-mesh screen and having an adhesion tension with the dispersed liquid not less than 2.5 times its adhesion tension with the continuous liquid, both said solids being insoluble in and chemically inert to all constituents of said emulsion and having a specific gravity materially different from that of said emulsion or any liquid constituent thereof, and so controlling the proportion of said fine solid in said emulsion as to produce resolution of said emulsion at a desired rate.

5. The method of resolving an emulsion which comprises: simultaneously and intimately contacting with said emulsion a relatively large quantity of a coarsely powdered solid having adhesion tension with the dispersed liquid not less than 1.5 times its adhesion tension with the continuous liquid and a relatively small quantity of a finely powdered solid produced by mutual abrasion of the grains of said coarsely powdered solid, both said solids being insoluble in and chemically inert to all constituents of said emulsion and having a specific gravity materially different from that of said emulsion, and so controlling the proportion of said fine solid in said emulsion as to produce resolution of said emulsion at a desired rate.

6. The method of resolving an oil-and-water emulsion which comprises: simultaneously and intimately contacting with said emulsion a relatively large quantity of a coarsely powdered solid and a relatively small quantity of a finely powdered solid, both said solids being insoluble in oil and water and chemically inert to all constituents of said emulsion and having adhesion tension with the dispersed liquid not substantially less than 2.5 times their adhesion tension with the continuous liquid and a specific gravity materially different from that of said emulsion, and so controlling the proportion of said fine solid in said emulsion as to produce resolution of said emulsion at a desired rate.

7. The method of resolving an oil-and-water emulsion which comprises: simultaneously and intimately contacting with said emulsion a relatively large quantity of a coarsely powdered solid having adhesion tension with the dispersed liquid not less than 1.5 times its adhesion tension with the continuous liquid and a relatively small quantity of a finely powdered solid having adhesion tension with the dispersed liquid not less than 2.5 times its adhesion tension with the continuous liquid, both said solids being insoluble in oil and water and chemically inert to all constituents of said emulsion and having a specific gravity materially different from that of said emulsion, and so controlling the proportion of said fine solid in said emulsion as to produce resolution of said emulsion at a desired rate.

8. The method of resolving an oil-and-water emulsion which comprises: simultaneously and intimately contacting with said emulsion a relatively large quantity of a solid body comminuted to be substantially retained on a 12-mesh screen and having an adhesion tension with the dispersed liquid not less than 1.5 times its adhesion tension with the continuous liquid, and a relatively small quantity of a solid body comminuted to substantially pass a 100-mesh screen and having an adhesion tension with the dispersed liquid not less than 2.5 times its adhesion tension with the continuous liquid, both said solids being insoluble in oil and water and chemically inert to all constituents of said emulsion and having a specific gravity less than that of the oil constituent of the emulsion or greater than that of water, and so controlling the proportion of said fine solid in said emulsion as to produce resolution of said emulsion at a desired rate.

9. The method of resolving an oil-and-water emulsion which comprises: simultaneously and intimately contacting with said emulsion a relatively large quantity of a coarsely powdered solid having adhesion tension with the dispersed liquid not less than 1.5 times its adhesion tension with the continuous liquid and a relatively small quantity of a finely powdered solid produced by mutual abrasion of the grains of said coarsely powdered solid, both said solids being insoluble in oil and water and chemically inert to all constituents of said emulsion and having a specific gravity materially different from that of said emulsion, and so controlling the proportion of said fine solid in said emulsion as to produce resolution of said emulsion at a desired rate.

10. The method of resolving an oil-in-water emulsion which comprises: simultaneously and intimately contacting with said emulsion a relatively large quantity of a coarsely powdered solid and a relatively small quantity of a finely powdered solid, both said solids being insoluble in oil and water and chemically inert to all constituents of said emulsion and having adhesion tension with oil not substantially less than 2.5 times their adhesion tension with water and having a specific gravity materially less than that of the oil constituent of said emulsion, and so controlling the proportion of said fine solid in said emulsion as to produce resolution of said emulsion at a desired rate.

11. The method of resolving an oil-in-water emulsion which comprises: simultaneously and intimately contacting with said emulsion a relatively large quantity of a coarsely powdered solid having adhesion tension with oil not less than 1.5 times its adhesion tension with water and a relatively small quantity of a finely powdered solid having adhesion tension with oil not less than 2.5 times its adhesion tension with water, both said solids being insoluble in oil and water and chemically inert to all constituents of said emulsion and having a specific gravity materially less than that of the oil constituent of said emulsion, and so controlling the proportion of said fine solid in said emulsion as to produce resolution of said emulsion at a desired rate.

12. The method of resolving an oil-in-water emulsion which comprises: simultaneously and intimately contacting with said emulsion a relatively large quantity of a solid body comminuted to be substantially retained on a 12-mesh screen and having an adhesion tension with the dispersed liquid not less than 1.5 times its adhesion tension with the continuous liquid, and a relatively small quantity of a solid body comminuted to substantially pass a 100-mesh screen and having an adhesion tension with the dispersed liquid not less than 2.5 times its adhesion tension with the continuous liquid, both said solids being insoluble in oil and water and chemically inert to all constituents of said emulsion and having a specific gravity materially less than that of the oil constituent of said emulsion, and so controlling the proportion of said fine solid in said emulsion as to produce resolution of said emulsion at a desired rate.

13. The method of resolving an oil-in-water emulsion which comprises: simultaneously and intimately contacting with said emulsion a relatively large quantity of a coarsely powdered solid having adhesion tension with oil not less than 1.5 times its adhesion tension with water and a relatively small quantity of a finely powdered solid produced by mutual abrasion of the grains of said coarsely powdered solid, both said solids being insoluble in oil and water and chemically inert to all constituents of said emulsion and having a specific gravity materially less than that of the oil constituent of said emulsion, and so controlling the proportion of fines in said emulsion as to produce resolution of said emulsion at a desired rate.

14. The method of resolving a water-in-oil emulsion which comprises: simultaneously and intimately contacting with said emulsion a relatively large quantity of a coarsely powdered solid and a relatively small quantity of a finely powdered solid, both said solids being insoluble in water and oil and chemically inert to all constituents of said emulsion and having adhesion tension with water not substantially less than 2.5 times their adhesion tension with oil and having a specific gravity materially greater than that of water, and so controlling the proportion of said fine solid in said emulsion as to produce resolution of said emulsion at a desired rate.

15. The method of resolving a water-in-oil emulsion which comprises: simultaneously and intimately contacting with said emulsion a relatively large quantity of a coarsely powdered solid having adhesion tension with water not less than 1.5 times its adhesion tension with oil and a relatively small quantity of a finely powdered solid having adhesion tension with water not less than 2.5 times its adhesion tension with oil, both said solids being insoluble in water and oil and chemically inert to all constituents of said emulsion and having a specific gravity materially greater than that of water, and so controlling the proportion of said fine solid in said emulsion as to produce resolution of said emulsion at a desired rate.

16. The method of resolving a water-in-oil emulsion which comprises: simultaneously and intimately contacting with said emulsion a relatively large quantity of a solid body comminuted to be substantially retained on a 12-mesh screen and a relatively small quantity of a solid body comminuted to substantially pass a 100-mesh screen, both said solids being insoluble in water and oil and chemically inert to all constituents of said emulsion and having adhesion tension with water not substantially less than 2.5 times their adhesion tension with oil and having a specific gravity materially greater than that of water, and so controlling the proportion of said fine solid in said emulsion as to produce resolution of said emulsion at a desired rate.

17. The method of resolving a water-in-oil emulsion which comprises: simultaneously and intimately contacting with said emulsion a relatively large quantity of a solid body comminuted to be substantially retained on a 12-mesh screen and having an adhesion tension with the dispersed liquid not less than 1.5 times its adhesion tension with the continuous liquid, and a relatively small quantity of a solid body comminuted to substantially pass a 100-mesh screen and having an adhesion tension with the dispersed liquid not less than 2.5 times its adhesion tension with the continuous liquid, both said solids being insoluble in water and oil and chemically inert to all constituents of said emulsion and having a specific gravity materially greater than that of water, and so controlling the proportion of said fine solid in said emulsion as to produce resolution of said emulsion at a desired rate.

18. The method of resolving a water-in-oil emulsion which comprises: simultaneously and intimately contacting with said emulsion a relatively large quantity of a coarsely powdered solid having adhesion tension with water not less than 1.5 times its adhesion tension with oil and a relatively small quantity of a finely powdered solid produced by mutual abrasion of the grains of said coarsely powdered solid, both said solids being insoluble in oil and water and chemically inert to all constituents of said emulsion and having a specific gravity materially greater than that of water, and so controlling the proportion of said fine solid in said emulsion as to produce resolution of said emulsion at a desired rate.

CHARLES J. ROBINSON.